(12) United States Patent
Deguchi

(10) Patent No.: US 10,413,978 B2
(45) Date of Patent: Sep. 17, 2019

(54) CUTTING TOOL AND METHOD FOR MANUFACTURING CUT WORKPIECE

(71) Applicant: Kyocera Corporation, Kyoto-shi, Kyoto (JP)

(72) Inventor: Shin Deguchi, Moriyama (JP)

(73) Assignee: KYOCERA CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 15/738,153

(22) PCT Filed: Jun. 27, 2016

(86) PCT No.: PCT/JP2016/069045
§ 371 (c)(1),
(2) Date: Dec. 20, 2017

(87) PCT Pub. No.: WO2016/208772
PCT Pub. Date: Dec. 29, 2016

(65) Prior Publication Data
US 2018/0185933 A1    Jul. 5, 2018

(30) Foreign Application Priority Data
Jun. 25, 2015   (JP) .................................. 2015-127264

(51) Int. Cl.
*B23C 5/24* (2006.01)
*B23C 5/28* (2006.01)
(Continued)

(52) U.S. Cl.
CPC .............. *B23C 5/06* (2013.01); *B23C 5/2208* (2013.01); *B23C 5/2221* (2013.01);
(Continued)

(58) Field of Classification Search
CPC ...... B23C 2200/0416; B23C 2210/282; B23C 5/06; B23C 5/24; B23C 5/28;
(Continued)

(56) References Cited

U.S. PATENT DOCUMENTS 4,848,977 A * 7/1989 Kieninger ............... B23C 5/207
407/39
6,176,648 B1    1/2001 Mizutani
(Continued)

FOREIGN PATENT DOCUMENTS

JP    H09225722 A    9/1997
JP    2000015515 A   1/2000
(Continued)

OTHER PUBLICATIONS

International Search Report based on Application No. PCT/JP2016/069045 (3 Pages) dated Jul. 26, 2016.

*Primary Examiner* — Nicole N Ramos
(74) *Attorney, Agent, or Firm* — Viering, Jentschura & Partner MBB

(57) ABSTRACT

In an embodiment, a cutting tool includes a holder and a cutting insert. The holder is elongated, extends from a first end to a second end along a rotational axis. The holder includes an insert pocket on a side of the first end. The cutting insert is located in the insert pocket and includes a cutting edge. The insert pocket includes an opening in an end surface of the first end and an outer peripheral surface adjacent to the first end of the holder. The cutting insert further includes a first portion that is located more radially inward than an outer peripheral opening of in the insert pocket in a front view of the first end of the holder. The first portion has a width greater than a width of the opening in a direction along a rotation direction of the rotation axis.

18 Claims, 17 Drawing Sheets

(51) Int. Cl.
*B23C 5/06* (2006.01)
*B23C 5/22* (2006.01)

(52) U.S. Cl.
CPC ............... *B23C 2200/0416* (2013.01); *B23C 2210/282* (2013.01); *B23C 2226/125* (2013.01); *B23C 2226/315* (2013.01); *B23C 2240/08* (2013.01)

(58) Field of Classification Search
CPC ............... B23C 5/2208; B23C 5/2221; Y10T 407/1906; Y10T 407/1908; Y10T 407/1932; Y10T 407/1934; Y10T 407/1936; Y10T 407/227
See application file for complete search history.

(56) References Cited

U.S. PATENT DOCUMENTS

| | | | |
|---|---|---|---|
| 8,092,124 B2* | 1/2012 | Spichtinger | B23C 5/006 407/11 |
| 2008/0232910 A1* | 9/2008 | Hecht | B23C 5/241 407/39 |
| 2011/0222973 A1* | 9/2011 | Baer | B23C 5/08 407/44 |

FOREIGN PATENT DOCUMENTS

| | | |
|---|---|---|
| JP | 2001150218 A | 6/2001 |
| JP | 2003094225 | 4/2003 |
| JP | 2015027708 A | 2/2015 |

\* cited by examiner

CUTTING TOOL AND METHOD FOR MANUFACTURING CUT WORKPIECE

RELATED APPLICATIONS

The present application is a national stage entry according to 35 U.S.C. § 371 of PCT application No.: PCT/JP2016/069045 filed on Jun. 27, 2016, which claims priority from Japanese application No.: 2015-127264 filed on Jun. 25, 2015 and is incorporated herein by reference in its entirety.

FIELD

The disclosure relates to a cutting tool and a method for manufacturing a cut workpiece.

BACKGROUND

A rotating cutting tool described in Patent Literature 1 is a cutting tool known for cutting a workpiece material such as a metal. The cutting tool described in Patent Literature 1 includes a cylindrical tool body (holder), and cutting edges (cutting inserts) attached to a plurality of cutting edge slots (insert pockets) on the periphery of the tool body.

To prevent the cutting inserts from being thrown off under a centrifugal force, the cutting tool described in Patent Literature 1 has V-notches on a base metal for the cutting inserts. The top ends of clamp screws are placed in contact with the V-notches.

The cutting inserts included in the cutting tool described in Patent Literature 1 can be fastened insufficiently with the clamp screws when having small V-notches into which the top ends of the clamp screws are placed in contact, and can have lower durability when having large V-notches.

CITATION LIST

Patent Literature

Patent Literature 1: Japanese Unexamined Patent Application Publication No. 2003-094225

SUMMARY

According to the disclosure, a cutting tool includes a holder and a cutting insert. The holder is elongated, extends from a first end to a second end along a rotation axis, and includes an insert pocket on a side of the first end. The cutting insert is located in the insert pocket and includes a cutting edge. The insert pocket includes an opening in an end surface of the first end and an outer peripheral surface adjacent to the first end of the holder. The cutting insert further includes a first portion that is located more radially inward than an outer peripheral opening of the insert pocket in a front view of the first end. The first portion has a greater width than the opening in a direction along a rotation direction of the rotation axis.

A method for manufacturing a cut workpiece according to the disclosure includes rotating the cutting tool, and placing the cutting edge included in the rotating cutting tool in contact with a workpiece material.

DETAILED DESCRIPTION

Figure 1:
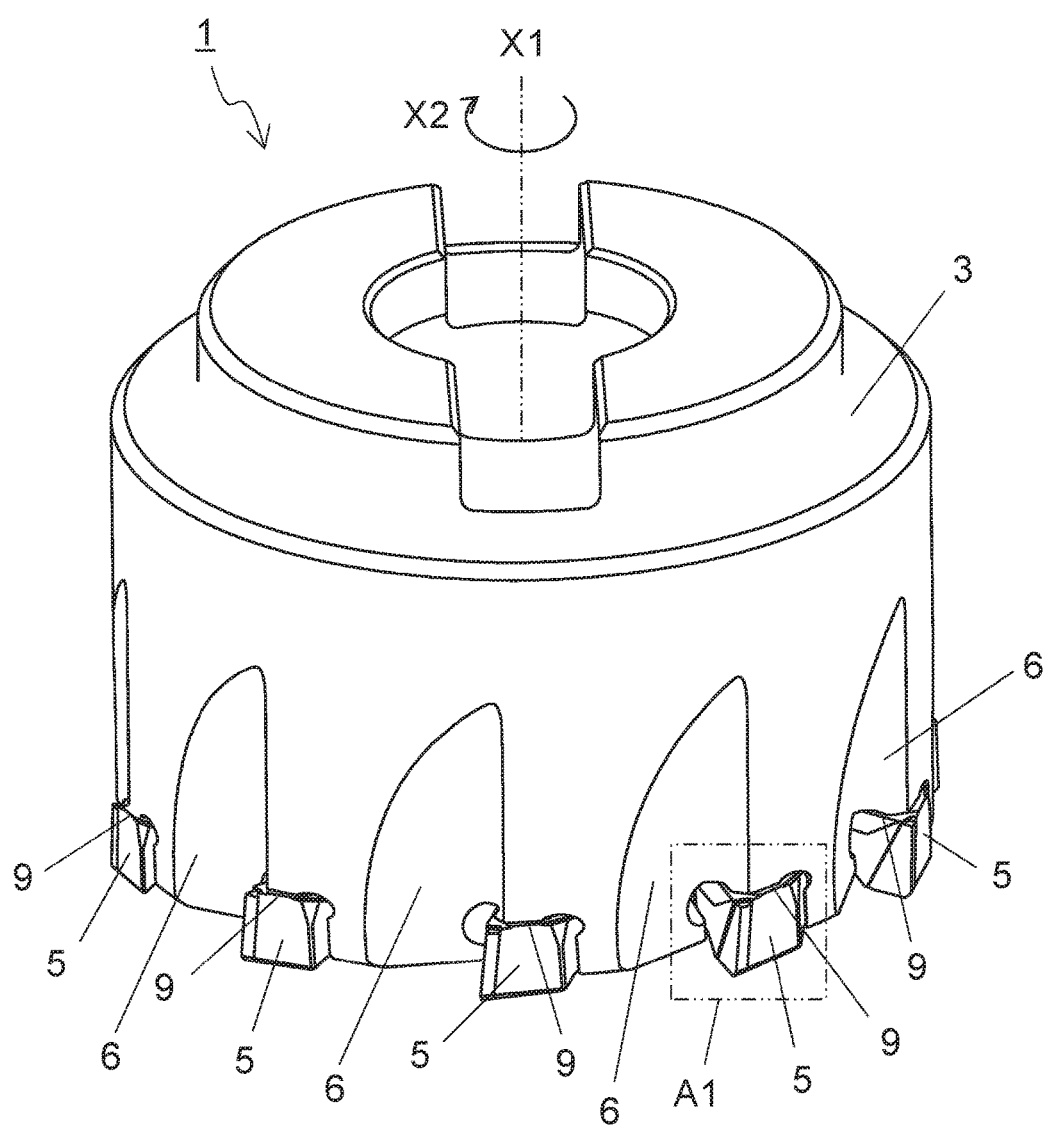
FIG. 1 is a perspective view of a cutting tool according to one embodiment of the disclosure.

A cutting tool 1 according to one embodiment of the disclosure will now be described below with reference to the drawings. The figures referred to herein show the main components of the cutting tool according to the present embodiment for ease of explanation. The cutting tool according to the disclosure may optionally include components that are not shown. The components shown in the figures may not exactly reflect their actual dimensions or dimensional proportions.

As shown in FIGS. 1 to 9, the cutting tool 1 according to the present embodiment includes a holder 3, a plurality of cutting inserts 5 (hereafter also simply, inserts 5), and a plurality of screws 7. Although the cutting tool 1 according to the present embodiment includes a plurality of inserts 5 and a plurality of screws 7, it may include a single insert 5 and a single screw 7.

The holder 3 is rotatable about a rotation axis X1, and is an elongated member extending from a first end to a second end along the rotation axis X1. More specifically, the holder 3 is substantially cylindrical in the present embodiment. During cutting of a workpiece material into a cut workpiece, the holder 3 rotates about the rotation axis X1 in a rotation direction X2 indicated by the arrow. In the present embodiment, the central axis of the cylindrical holder 3 is identical to the rotation axis X1 of the holder 3. The first end is an end at which the inserts 5 are arranged. The second end is an end opposite to the first end.

Figure 3:
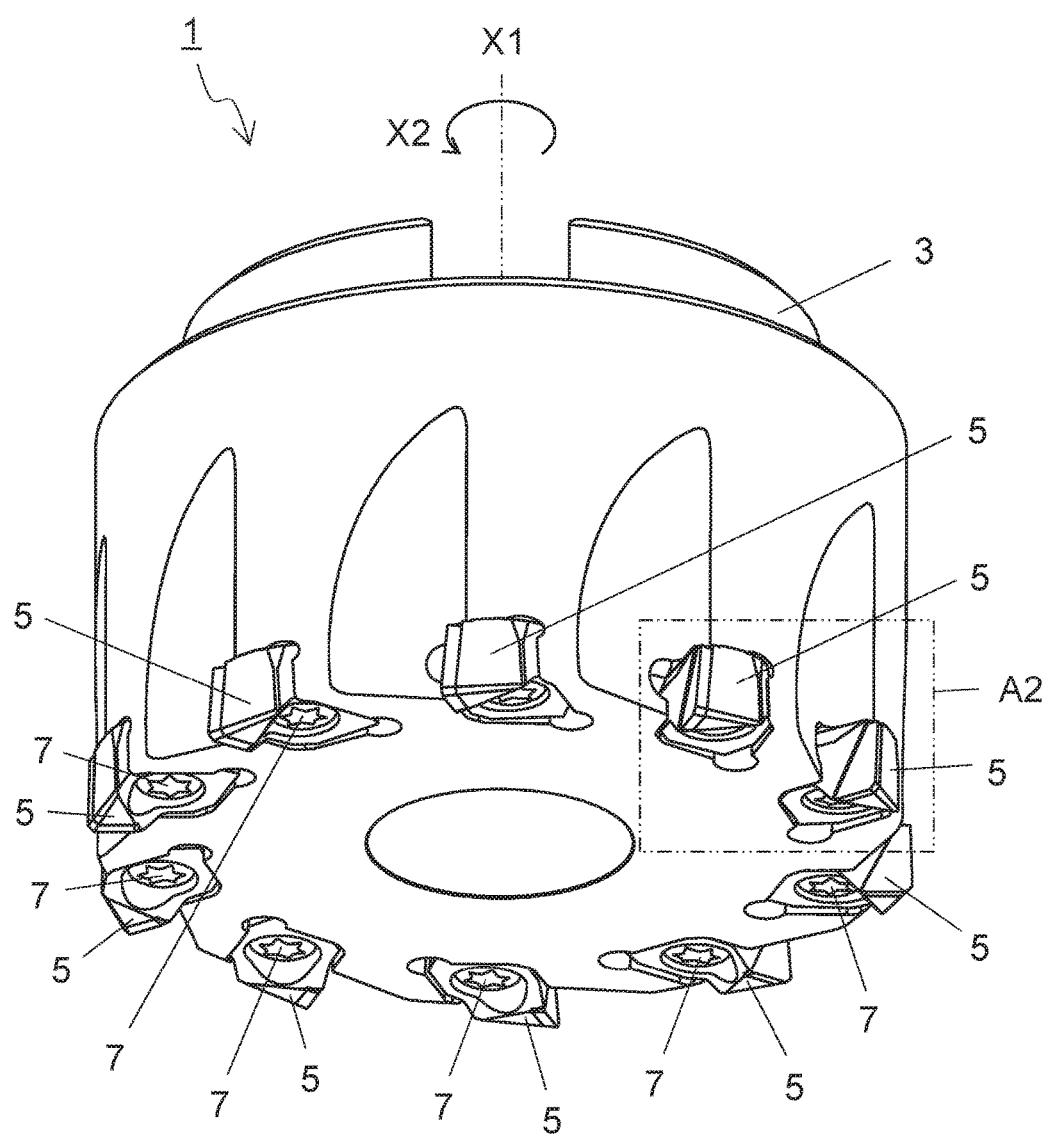
FIG. 3 is a perspective view of the cutting tool shown in FIG. 1 viewed in another direction.
Figure 4:
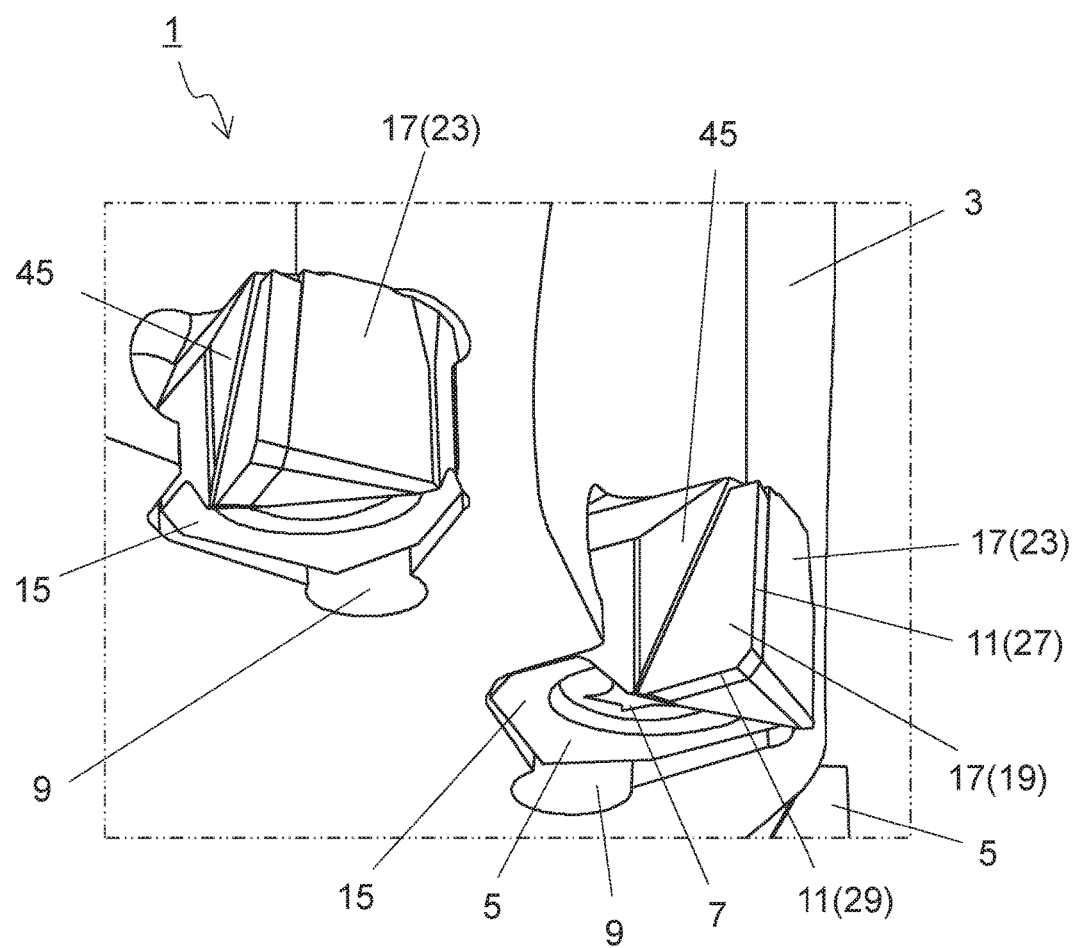
FIG. 4 is an enlarged view of an area A2 shown in FIG. 3.

Hereafter, a top end refers to the first end, and a rear end refers to the second end. In describing the positions of the components of the cutting tool 1 relative to one another, being adjacent to the top end refers to being nearer the top end than the rear end, and being adjacent to the rear end refers to being nearer the rear end than the top end. Inward or radially inward refers to the direction toward the rotation axis X1, and outward or radially outward refers to the direction away from the rotation axis X1. The radially inward direction is thus the direction toward the rotation axis X1, and the radially outward direction is the direction away from the rotation axis X1. Toward the top end refers to the direction from the rear end toward the top end of the holder 3, and toward the rear end refers to the direction from the top end toward the rear end of the holder 3. FIG. 1 is a perspective view of the cutting tool 1 showing its rear end. FIG. 3 is a perspective view of the cutting tool 1 showing its top end.

The holder 3 in the present embodiment includes a plurality of insert pockets 9 (hereafter also simply, pockets 9) arranged adjacent to the top end. Each pocket 9 receives the insert 5 in a removable manner. The surface of the pocket 9 is in contact with the insert 5 or faces the insert 5 with a small gap. In correspondence with the plurality of inserts 5 included in the cutting tool 1 according to the present embodiment, the holder 3 includes a plurality of pockets 9. The pockets 9 are open radially outward at the top end of the holder 3. More specifically, the pockets 9 are open at the end surface and the outer peripheral surface of the top end of the holder 3. Each pocket 9 thus includes a first opening 9a open toward the top end (top end opening), and a second opening 9b open radially outward (outer peripheral opening).

Figure 5:
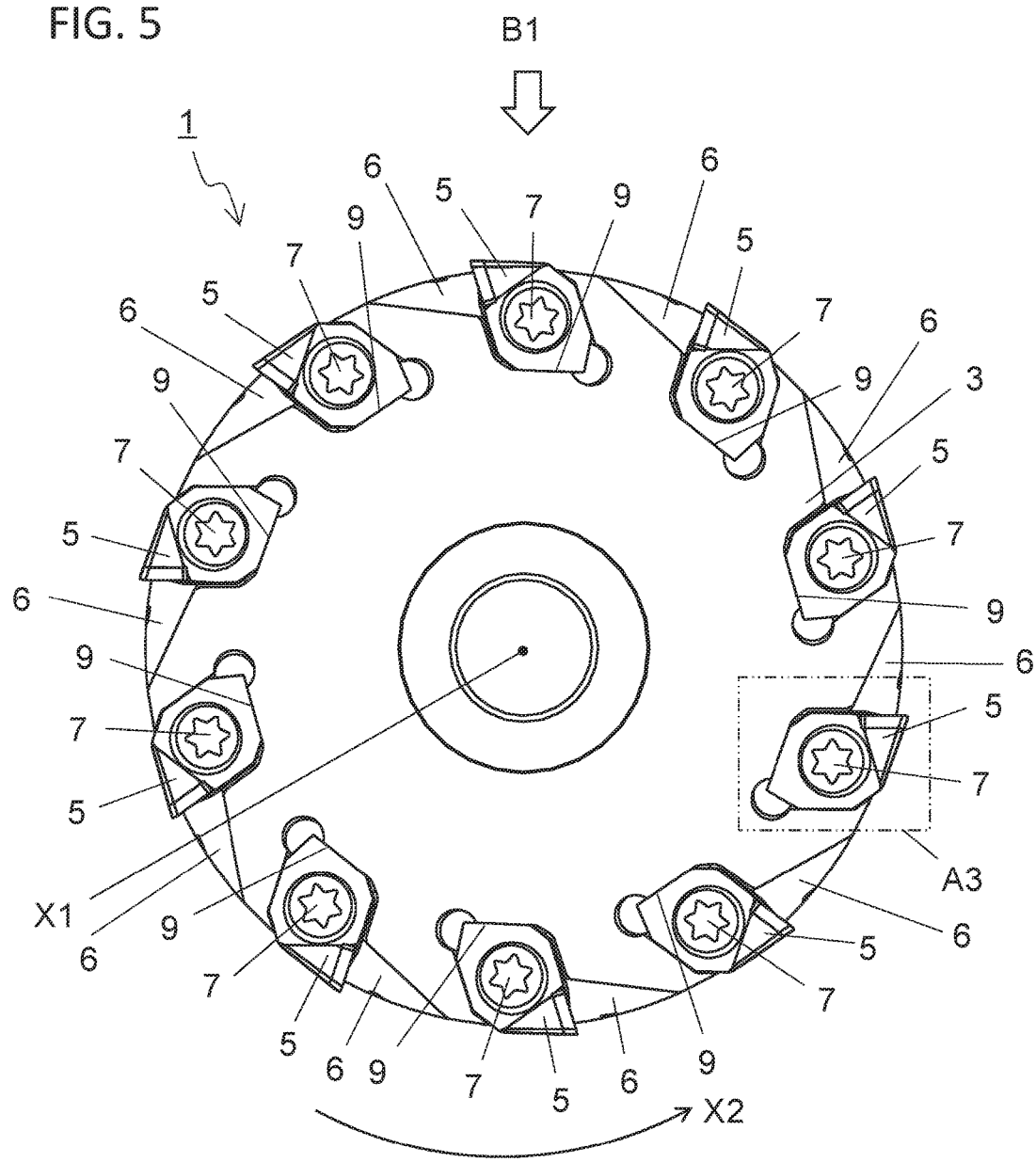
FIG. 5 is a plan view of a first end (top end) of the cutting tool shown in FIG. 1.

As shown in FIG. 5, although the plurality of pockets 9 in the present embodiment are arranged at equal intervals in a manner rotationally symmetric about the rotation axis X1, the pockets 9 may be at unequal intervals. The structure in which adjacent pockets 9 are at equal intervals reduces variations in the cutting load applied to the inserts 5 attached in the pockets 9.

As shown in FIGS. 1 and 5, the holder 3 includes a plurality of chip pockets 6, which are adjacent to the respective insert pockets 9. Chips generated by the insert 5 attached in each insert pocket 9 are cleared away through the corresponding chip pocket 6.

The holder 3 may be formed from, for example, steel, cast iron, and an aluminum alloy. The cutting tool 1 according to the present embodiment may include the holder 3 formed from high-strength steel. The holder 3 may have a size determined appropriately depending on the size of the workpiece material. For example, the holder 3 has a length of, for example, about 30 to 90 mm in a direction along the rotation axis X1. The holder 3 has a width of about 20 to 500 mm (diameter) in a direction perpendicular to the rotation axis X1. The holder 3 has the plurality of pockets 9, and thus is not precisely cylindrical. The holder 3 may not be formed from a single member as in the present embodiment, and may be formed from a plurality of members. For example, the holder 3 may include a fastener that fastens the inserts 5 and a body member that holds the fastener.

In the present embodiment, the holder 3 includes ten pockets 9. The ten pockets 9 each receive the insert 5 in a removable manner. The cutting tool 1 according to the present embodiment thus includes ten inserts 5. In the present embodiment, each insert 5 is attached in the corresponding pocket 9 through the first opening 9a that is open toward the top end in the pocket 9. Each insert 5 is fastened in the corresponding pocket 9 with a screw 7. The cutting tool 1 according to the present embodiment thus includes ten screws 7, which are used to fasten the inserts 5 to the pockets 9. The numbers of pockets 9, inserts 5, and screws 7 may not be ten.

Figure 11:
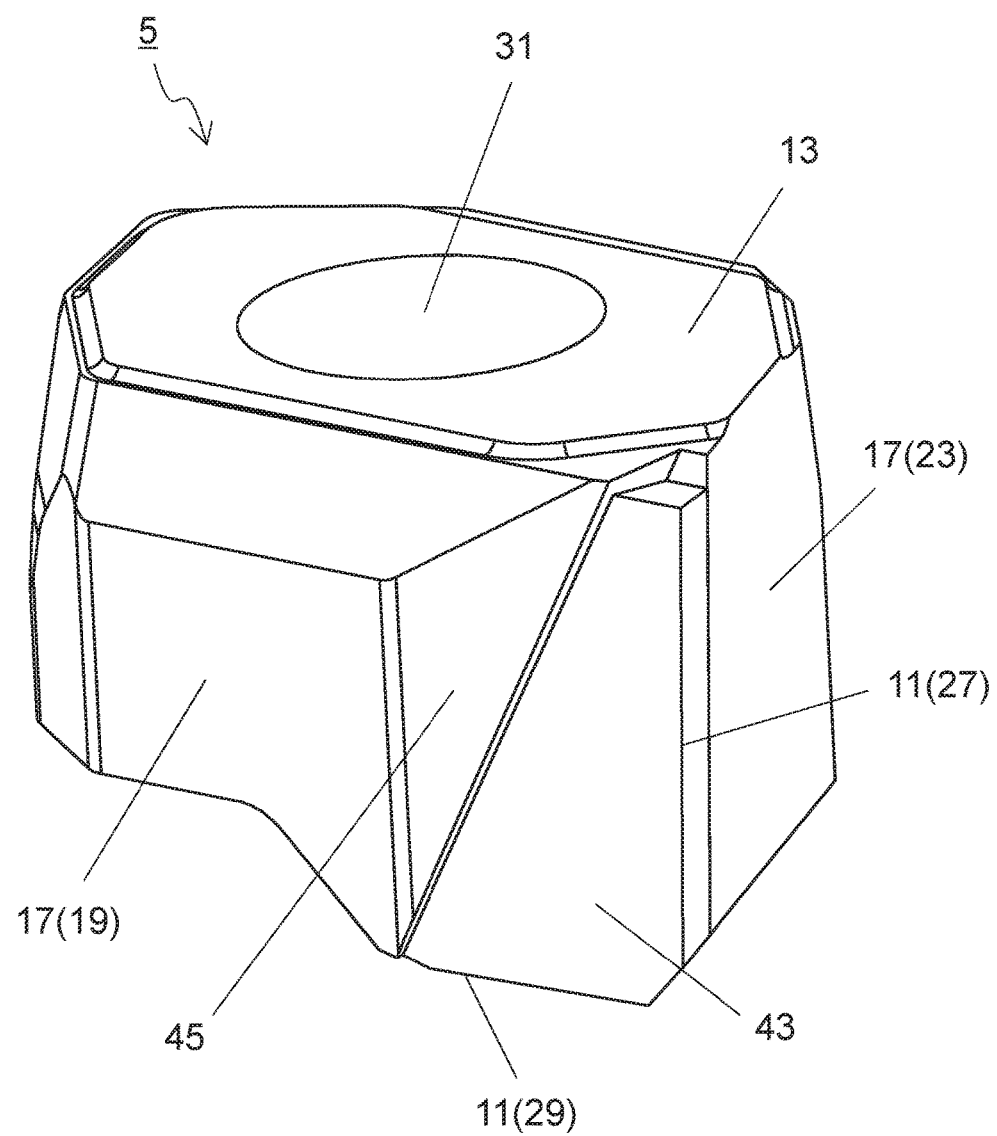
FIG. 11 is a perspective view of a cutting insert in the cutting tool shown in FIG. 1.
Figure 12:
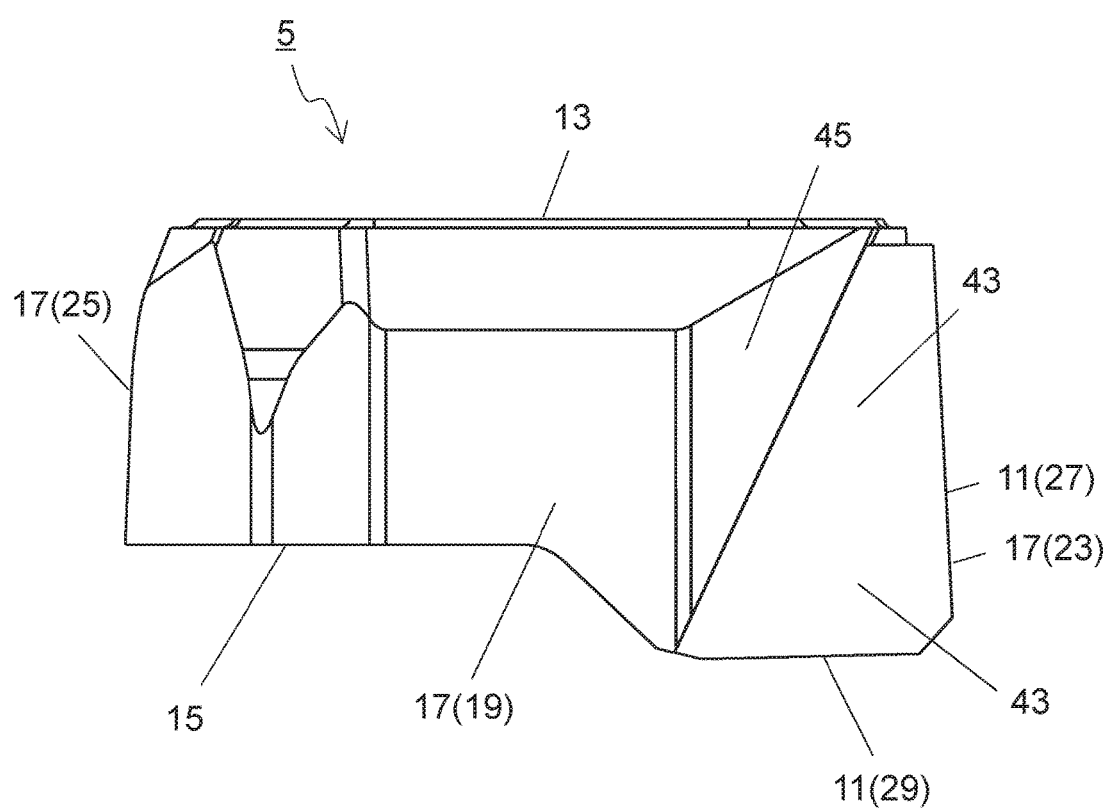
FIG. 12 is a side view of the cutting insert shown in FIG. 11 at a first side surface (front side surface).
Figure 13:
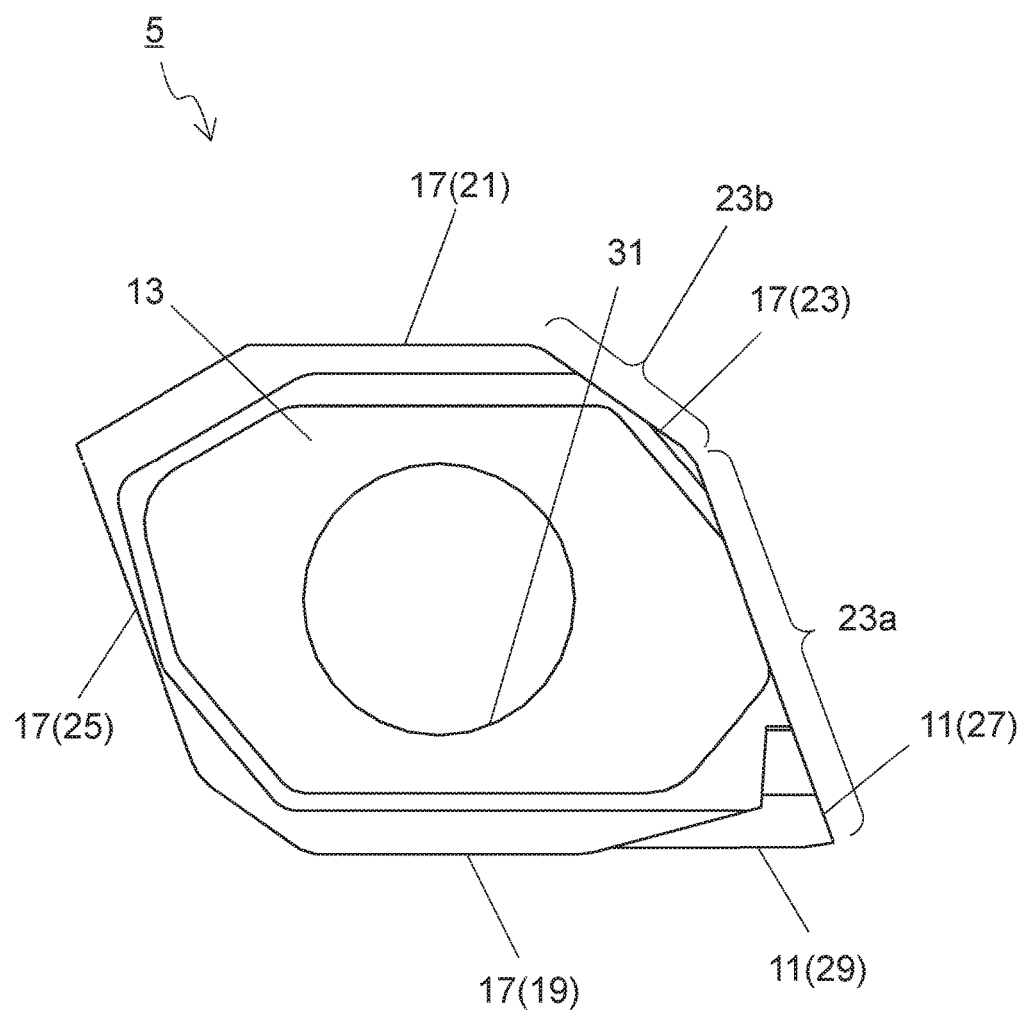
FIG. 13 is a plan view of the cutting insert shown in FIG. 11 at an upper surface.

As shown in FIGS. 11 to 13, each insert 5 in the present embodiment is an elongated member with a cutting edge 11. More specifically, the insert 5 is a quadrangular prism having a quadrangular upper surface 13, a quadrangular lower surface 15, and side surfaces 17 connecting the upper surface 13 and the lower surface 15. When the insert 5 is attached to the holder 3, the upper surface 13 is located adjacent to the rear end and the lower surface 15 is located adjacent to the top end. The side surfaces 17 include four surface areas, which are a first side surface 19, a second side surface 23, a third side surface 25 and a fourth side surface 21, in correspondence with the sides of the quadrangular upper surface 13 and the quadrangular lower surface 15.

When the insert 5 is attached to the holder 3, the upper surface 13 is located adjacent to the rear end (the upper side in FIG. 12), and comes in contact with the pocket 9 in the holder 3. When the insert 5 is attached to the holder 3, the lower surface 15 is located adjacent to the top end (the lower side in FIG. 12), and protrudes from the holder 3 toward the top end. In the present embodiment, the lower surface 15 does not entirely protrude from the holder 3 toward the top end and a part of the lower surface 15 adjacent to the second side surface 23 protrudes from the holder 3 toward the top end.

The first side surface 19 (hereafter, front side surface 19) is a surface area located frontward in the rotation direction X2 when the insert 5 is attached to the holder 3. The front side surface 19 is rectangular and has its longer sides in a direction perpendicular to the rotation axis X1 when viewed from the front in the rotation direction X2.

The fourth side surface 21 (hereafter, the back side surface 21) is a surface area located backward in the rotation direction X2 when the insert 5 is attached to the holder 3. The back side surface 21 is located opposite to the front side surface 19. The back side surface 21 comes in contact with the pocket 9 when the insert 5 is attached to the holder 3.

The second side surface (hereafter, the outer side surface 23) is a surface area located radially outward from the holder 3 when the insert 5 is attached to the holder 3. The outer side surface 23 is radially outward from the holder 3 when the insert 5 is attached to the holder 3. In the present embodiment, a part of the outer side surface 23 adjacent to the lower surface 15 is located radially outward from the holder 3 in the front in the rotation direction X2.

The third side surface (hereafter, the inner side surface 25) is a surface area located radially inward from the holder 3 when the insert 5 is attached to the holder 3. The inner side surface 25 comes in contact with the pocket 9 when the insert 5 is attached to the holder 3.

The four surface areas, which are the front side surface 19, the back side surface 21, the outer side surface 23, and the inner side surface 25, are substantially quadrangular. The four surface areas, which are the front side surface 21, the rear side surface 23, the outer side surface 25, and the inner side surface 27, each have four corners where the surfaces meet. The upper surface 13, the lower surface 15, the front side surface 19, the back side surface 21, the outer side surface 23, and the inner side surface 25 being quadrangular refer to those surfaces being substantially quadrangular. The surfaces may not be precisely quadrangular. Each side surface may have four round corners when viewed from the front. The sides, which connect adjacent corners, may not be precisely straight, and may be partially irregular.

Figure 6:
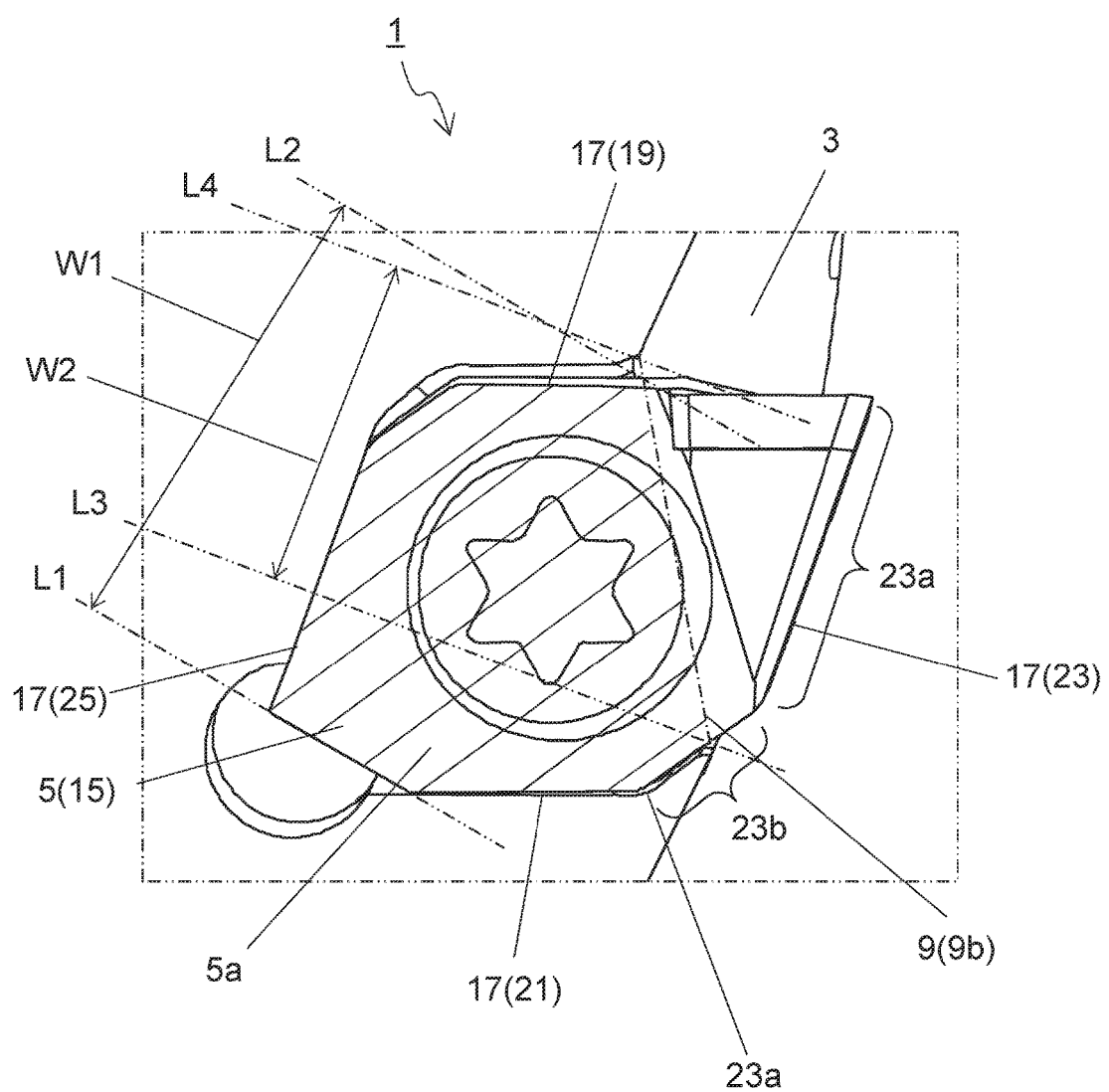
FIG. 6 is an enlarged view of an area A3 shown in FIG. 5.
Figure 7:
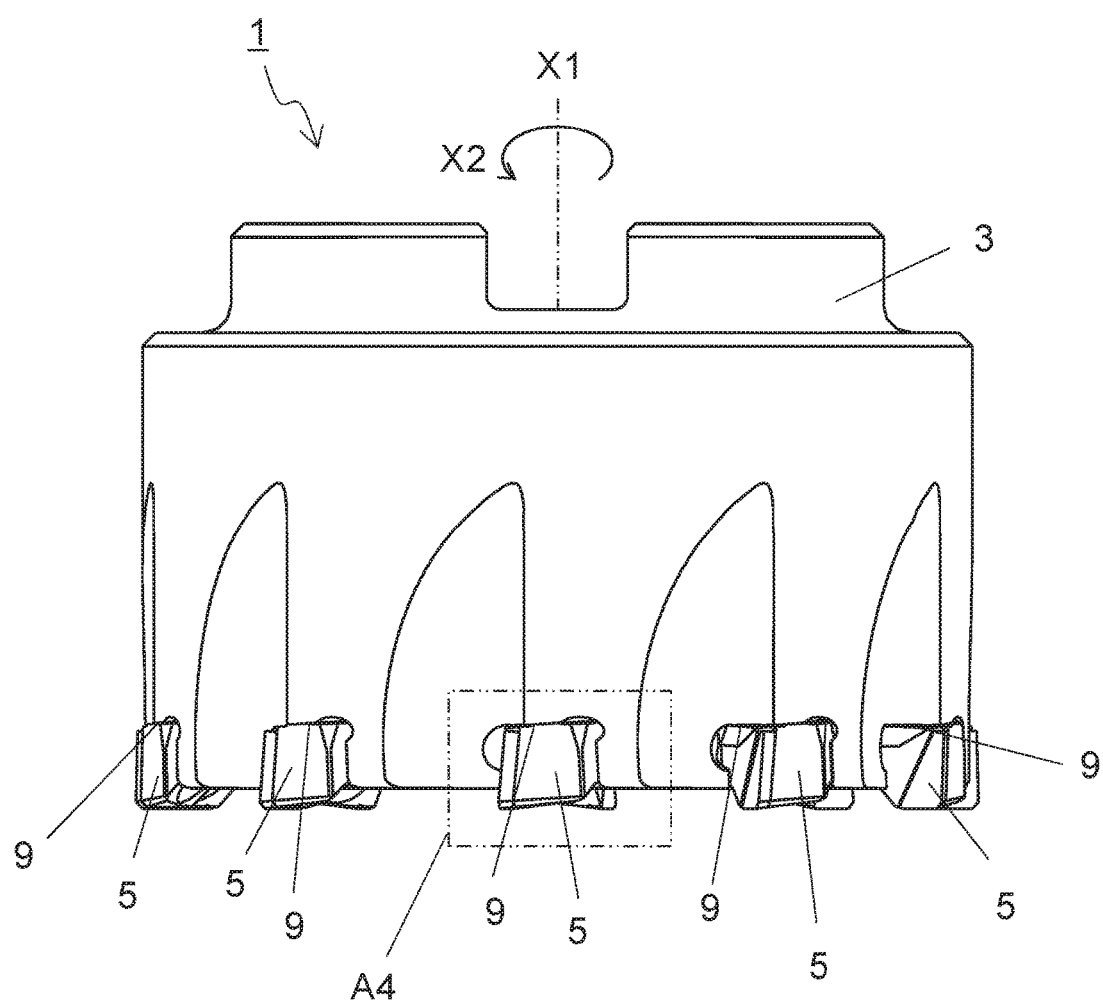
FIG. 7 is a side view in a direction B1 shown in FIG. 5.

Although the back side surface 21 and the inner side surface 25 come in contact with the pocket 9 as described above, the surfaces do not entirely come in contact with the pocket 9. As shown in FIG. 6, the ridgeline at the boundary between the back side surface 21 and the inner side surface 25 and the ridgeline at the boundary between the back side surface 21 and the outer side surface 23 in the insert 5 shaped in a quadrangular prism are both spaced from and are not in contact with the surface of the pocket 9. This lowers the likelihood that the load from the cutting resistance concentrates on the portion in the pocket 9 in contact with the ridgelines during the cutting process. This structure increases the durability of the holder 3.

As described above, the insert 5 includes the cutting edge 11. The cutting edge 11 defines the ridgeline between the front side surface 19 and the outer side surface 23 and at least a part of the ridgeline between the front side surface 19 and the lower surface 15. More specifically, a first cutting edge (hereafter, a peripheral cutting edge 27) defines the ridgeline between the front side surface 19 and the outer side surface 23 includes, and a top cutting edge 29 defines the ridgeline between the front side surface 19 and the lower surface 15. The cutting edge 11 in the present embodiment includes the peripheral cutting edge 27 and the top cutting edge 29. The peripheral cutting edge 27 has a length of, for example, about 1 to 10 mm. The top cutting edge 29 has a length of, for example, about 0.5 to 10 mm.

The cutting tool 1 according to the present embodiment may be used in milling. In milling, the cutting tool 1 can cut a workpiece material while its holder 3 is rotating about the rotation axis X1 and moving in a direction substantially perpendicular to the rotation axis X1. The peripheral cutting edge 27 may be used as a major cutting edge used to cut the workpiece material. The top cutting edge 29 may be used as a wiper edge for reducing the irregularity of the machined surface of the workpiece material.

The peripheral cutting edge 27 and the top cutting edge 29 are arranged on the perimeter of the front side surface 19. The front side surface 19 is located frontward in the rotation direction X2. The front side surface 19 thus includes an area that serves as a rake face, along which chips are cleared away during the cutting process.

The peripheral cutting edge 27 defines the ridgeline between the front side surface 19 and the outer side surface 23. The outer side surface 23 thus includes an area that serves as a flank. The top cutting edge 29 defines the ridgeline between the front side surface 19 and the lower surface 15. The lower surface 15 thus also includes an area that serves as a flank.

The insert 5 is formed from, for example, a cemented carbide or a cermet. The cemented carbide may be, for example, WC—Co, WC—TiC—Co, or WC—TiC—TaC—Co. The compound WC—Co is prepared by sintering tungsten carbide (WC) to which cobalt (Co) powder has been added. The compound WC—Tic-Co is prepared by adding titanium carbide (TiC) to the compound WC—Co. The compound WC—TiC—TaC—Co is prepared by adding tantalum carbide (TaC) to the compound WC—TiC—Co. The cermet is a sintered composite of ceramic and metal materials. Examples include cermets that mainly contain a titanium compound such as titanium carbide (TiC) or titanium nitride (TiN).

The surface of the insert 5 may be coated through chemical vapor deposition (CVD) or physical vapor deposition (PVD). The coating may contain, for example, TiC, TiN, titanium carbonitride (TiCN), and alumina ($Al_2O_3$). To increase the strength of the cutting edge, the insert 5 including the substrate formed from the above materials may be brazed with a sintered diamond or a sintered cubic boron nitride (CBN).

The insert 5 in the present embodiment has a through-hole 31 extending between the lower surface 15 and the upper surface 13. More specifically, the through-hole 31 in the present embodiment extends from the lower surface 15 in the direction along the rotation axis X1. In other words, the through-hole 31 in the present embodiment is not open at the front side surface 19, the outer side surface 23, the back side surface 21, and the inner side surface 25.

The through-hole 31 extending in the direction along the rotation axis X1 may not be the through-hole 31 extending precisely parallel to the rotation axis X1. The through-hole 31 may extend substantially from the lower surface 15 to the upper surface 13. The through-hole 31 may tilt with respect to the rotation axis X1 by an angle of, for example, about 10 degrees.

The through-hole 31 allows the insert 5 to be screwed into the holder 3. More specifically, the insert 5 is fastened to the holder 3 by inserting a screw 7 into the through-hole 31 in the insert 5, inserting the top end of the screw 7 into a threaded hole in the holder 3, and fastening the screw 7 in the threaded hole.

Although the through-hole 31 for fastening the insert 5 to the holder 3 with the screw 7 may extend in a direction other than the direction along the rotation axis X1, the through-hole 31 extending in the direction along the rotation axis X1 as in the present embodiment allows downsizing of the cutting tool 1. The insert 5 having the through-hole 31 extending in the direction along the rotation axis X1 may not have a space in its front for fastening the screw 7, and thus can increase the thickness of its part located backward from the peripheral cutting edge 27 in the rotation direction X2. This structure allows downsizing of the holder 3. The insert 5 can increase the thickness as described above. Thus, the holder 3 can include more inserts 5, and can improve the cutting efficiency.

Although the insert 5 is fastened to the holder 3 by inserting the screw 7 into the through-hole 31 in the insert 5 in the present embodiment, the insert 5 may be fastened to the holder 3 with any method, such as using a clamping structure.

The insert 5 may have any size. In its plan view shown in FIG. 13, for example, the insert 5 may have a maximum width of about 5 to 20 mm between the front side surface 19 and the back side surface 21. The insert 5 may also have a maximum width of about 5 to 20 mm between the inner side surface 25 and the outer side surface 23, and further have a maximum distance of about 3 to 10 mm between the upper surface 13 and the lower surface 15 in the direction along the central axis of the through-hole 31.

In the cutting tool 1 according to the present embodiment, the insert 5 is attached to the holder 3 to have the peripheral cutting edge 27 tilting with respect to the rotation axis X1. This tilt angle, which is commonly referred to as an axial rake, is greater than 0 degrees and not greater than 20 degrees in the present embodiment.

Figure 10:
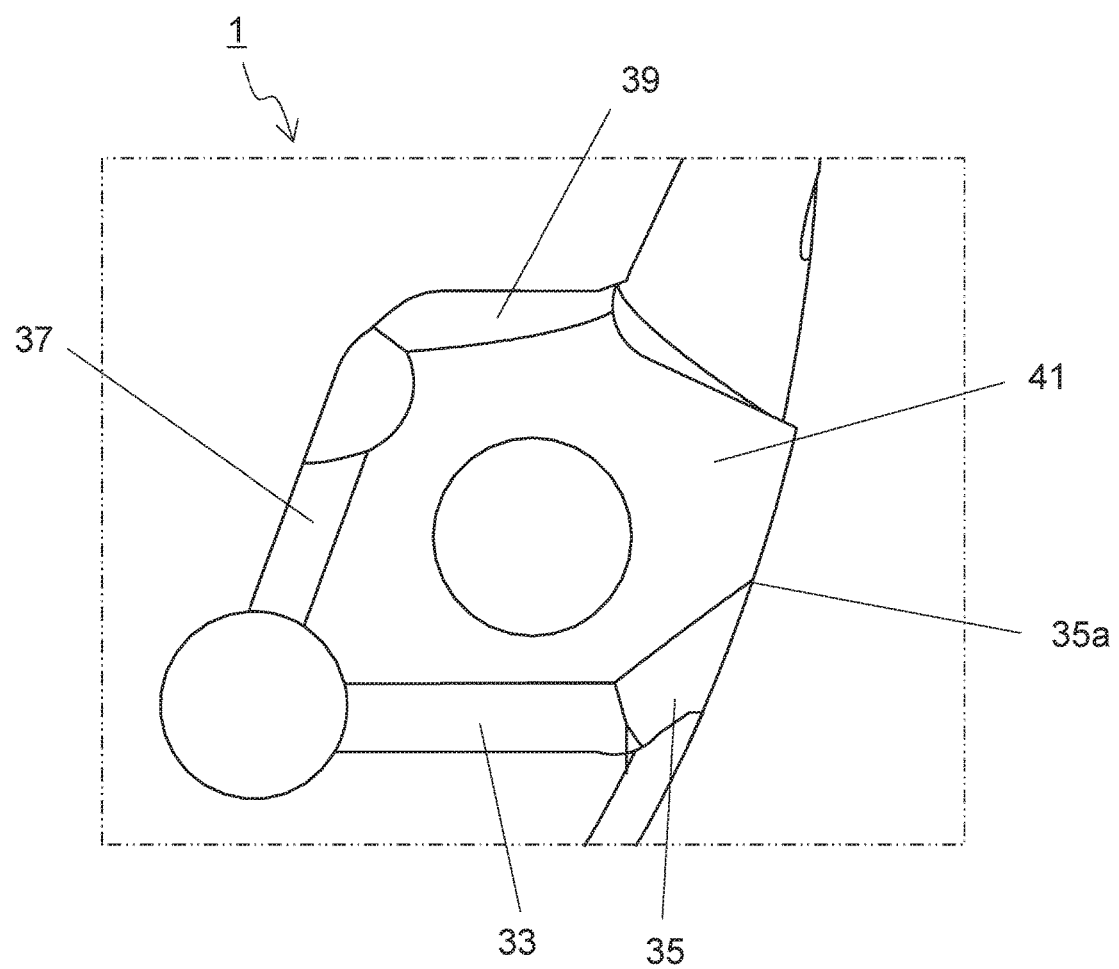
FIG. 10 is an enlarged view of a holder in the same area as shown in FIG. 9.

As shown in FIG. 10, the pocket 9 in the holder 3 includes a first inner surface 33, a second inner surface 35, a third inner surface 37, and a fourth inner surface 39 as its inner wall surfaces, and a fifth inner surface 41 as its inner bottom surface.

Among the four inner wall surfaces, the first inner surface 33 is located backward in the rotation direction X2. The first inner surface 33 faces frontward in the rotation direction X2 and is placed in contact with the back side surface 21 of the insert 5.

Among the four inner surfaces, the second inner surface 35 is located backward in the rotation direction X2. The second inner surface 35 is adjacent to the first inner surface 33 and is located more radially outward than the first inner surface 33.

Among the four inner wall surfaces, the third inner surface 37 is located radially inward and adjacent to the first inner surface 33. The third inner surface 37 faces toward the outer periphery of the holder 3. The third inner surface 37 is placed in contact with the inner side surface 25 of the insert 5.

Among the four inner wall surfaces, the fourth inner surface 39 is located frontward in the rotation direction X2, and faces the front side surface 19 of the insert 5. A small gap between the third inner surface 37 of the pocket 9 and the front side surface 19 of the insert 5 allows the insert 5 to be attached in the pocket 9 easily.

The fifth inner surface 41 is the inner bottom surface adjacent to the rear end. The fifth inner surface 41 is adjacent to the first inner surface 33, the second inner surface 35, the third inner surface 37, and the fourth inner surface 39, and faces toward the top end of the holder 3. The fifth inner surface 41 is placed in contact with the upper surface 13 of the insert 5.

In the present embodiment, the back side surface 21, the inner side surface 25, and the upper surface 13 of the insert 5 are placed in contact with the first inner surface 33, the third inner surface 37, and the fifth inner surface 41 of the pocket 9, respectively to position the insert 5 in the pocket 9.

In the cutting tool 1 according to the present embodiment, the back side surface 21 of the insert 5 is placed in contact with the surface of the pocket 9, or more specifically in contact with the first inner surface 33, whereas the front side surface 19 of the insert 5 is spaced from the surface of the pocket 9, or more specifically from the fourth inner surface 39. More specifically, the back side surface 21 of the insert 5 located backward in the rotation direction X2 is thus placed in contact with the first inner surface 33. This placement allows the holder 3 to stably hold the insert 5 against the cutting resistance applied backward in the rotation direction X2 from the peripheral cutting edge 27 when a workpiece material is cut with the peripheral cutting edge 27.

Figure 8:
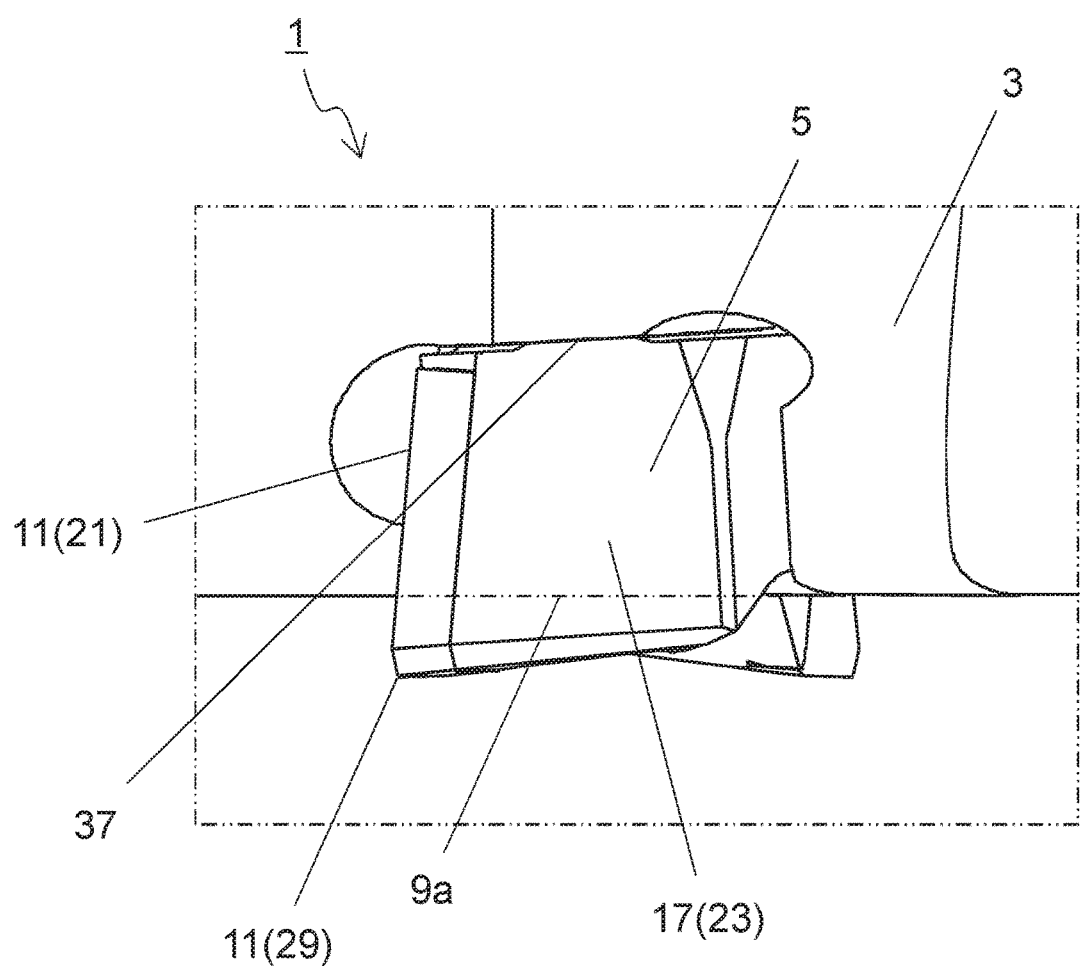
FIG. 8 is an enlarged view of an area A4 shown in FIG. 7.

As described above, the pocket 9 in the present embodiment includes the first opening 9a, which is open toward the top end, and the second opening 9b, which is open radially outward. As shown in FIG. 8, the first opening 9a is viewable in a side view of when the holder 3. More specifically, the first opening 9a is a part of a plane including the top end surface of the holder 3 and is defined by the first inner surface 33, the second inner surface 35, the third inner surface 37, and the fourth inner surface 39. As shown in FIG. 6, the second opening 9b is viewable in a top end view of the holder 3. More specifically, the second opening 9b is a part of a plane including a line connecting an outer peripheral end of the second inner surface 35 and an outer peripheral end of the fourth inner surface 39 and is defined by the second inner surface 35, the fourth inner surface 39, the fifth inner surface 41, and a plane obtained by extending the top end surface of the holder 3, among the planes perpendicular to the fifth inner surface 41.

In the front view of the top end surface of the cutting tool 1 (hereafter referred to as in the top end view of the cutting tool 1 or simply as in the top end view) as in FIG. 6, the insert 5 in the present embodiment includes a first portion 5a located more radially inward than an outer peripheral opening (second opening 9b) in the pocket 9. In the direction along the rotation direction X2, the first portion 5a has a width W1 greater than a width W2 of the second opening 9b.

In other words, the insert 5 has a portion that is located more radially inward than the second opening 9b and has a width greater than the width W2 of the second opening 9b in the direction along the rotation direction X2. This portion is hereafter referred to as the first portion 5a.

A first virtual straight line L1 extends radially from a back end of the first portion 5a in the rotation direction X2. A second virtual straight line L2 extends on a front end of the first portion 5a in a rotation direction X2 and extends parallel to the first virtual straight line L1. The distance between the first virtual straight line L1 and the second virtual straight line L2 can be defined as the width W1 of the first portion 5a in the direction along the rotation direction X2.

The width W2 of the second opening 9b in the direction along the rotation direction X2 is defined in the manner described below. The pocket 9 has a front end that is located most radially outward in its portion to be placed in contact with or face the side surface 17 of the insert 5 at a position frontward in the rotation direction X2. The pocket 9 has a back end that is located most radially outward in its portion to be placed in contact with or face the side surface 17 of the insert 5 at a position backward in the rotation direction X2.

A third virtual straight line L3 extends radially from the back end. A fourth virtual straight line L4 extends on the front end and extends parallel to the third virtual straight line L3. The distance between the third virtual straight line L3 and the fourth virtual straight line L4 can be defined as the width W2 of the second opening 9b in the direction along in the rotation direction X2.

Being located radially inward herein refers to being located more radially inward than a virtual circle having the rotation axis X1 as its center and passing through a reference area in the top end view of the cutting tool 1. For example, the first portion 5a located more radially inward than the second opening 9b refers to the first portion 5a located more radially inward than a virtual circle having the rotation axis X1 as its center and passing through the second opening 9b in the top end view of the cutting tool 1.

In particular cutting processing such as milling, the cutting tool 1 is rotated at high speed, and the insert 5 receives a large centrifugal force. In the present embodiment, when the insert 5 is placed under a large centrifugal force during the cutting process, the first portion 5a in the insert 5 is caught at the second opening 9b in the pocket 9. The insert 5 is thus less likely to be thrown off outside by the centrifugal force.

The insert 5 eliminates a clamping structure, such as V-notches, as a thrown-off prevention mechanism. The insert 5 can thus have high durability. The insert 5 including no clamping structure using clamp screws may not have a space for fastening clamp screws frontward in the rotation direction X2. This allows downsizing of the holder 3, and increases the number of inserts 5 to be attached to the holder 3.

Figure 14:
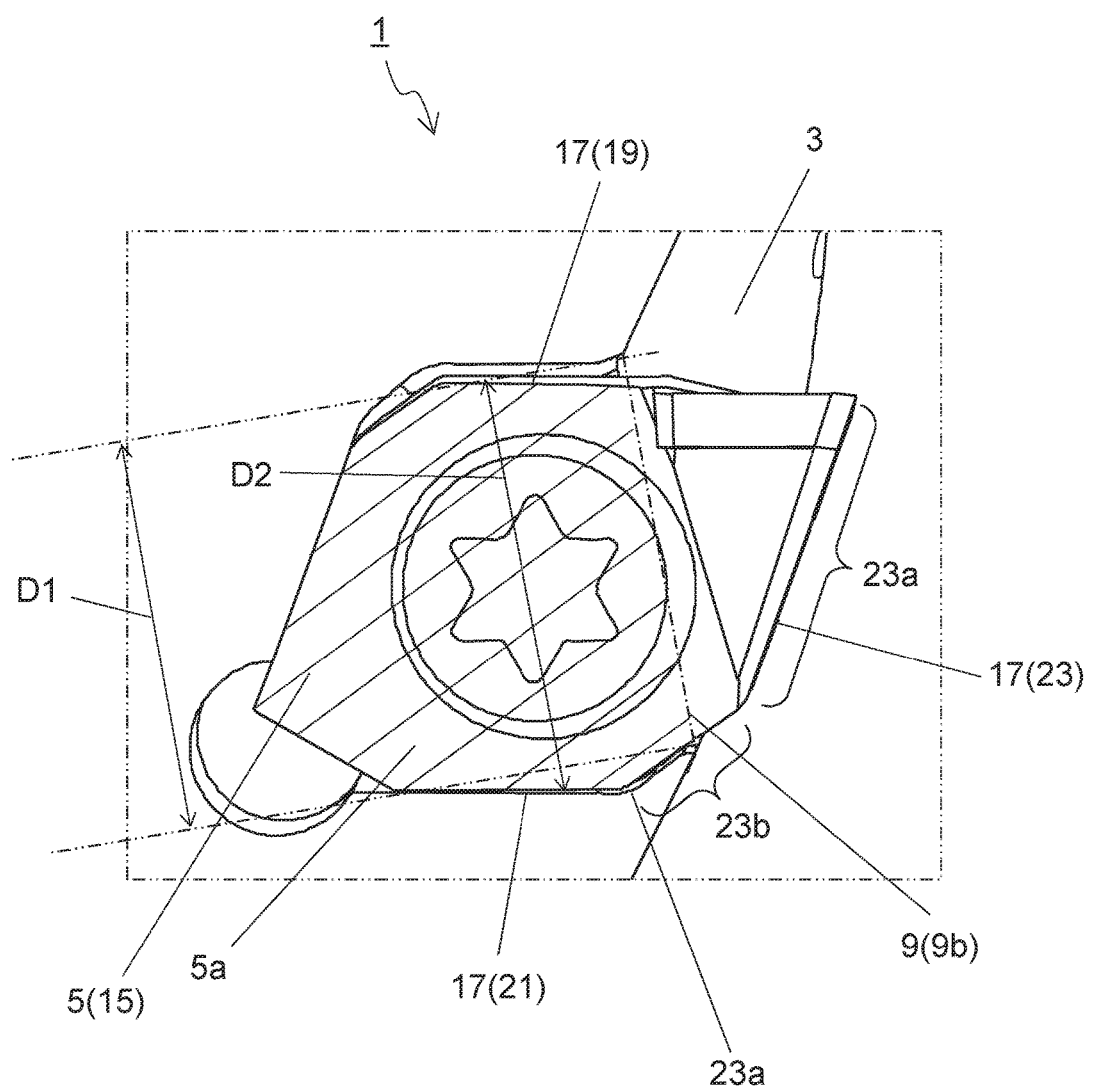
FIG. 14 is an enlarged view of the same area as shown in FIG. 6.

In the present embodiment, the second opening 9b and the first portion 5a may satisfy the following relationship as shown in FIG. 14. In the top end view, the first portion 5a has a length D2 that is longer than a length D1 of the second opening 9b in a direction parallel to the open length of the second opening 9b. This structure also lowers the likelihood that the insert 5 is thrown off outside under a large centrifugal force.

As shown in FIG. 14, the length D1 of the second opening 9b is a direct distance between the front end and the back end of the second opening 9b in the top end view. The length D2 of the first portion 5a is a maximum value for the length of the first portion 5a in a direction parallel to the length D1 of the second opening 9b in the top end view.

Figure 9:
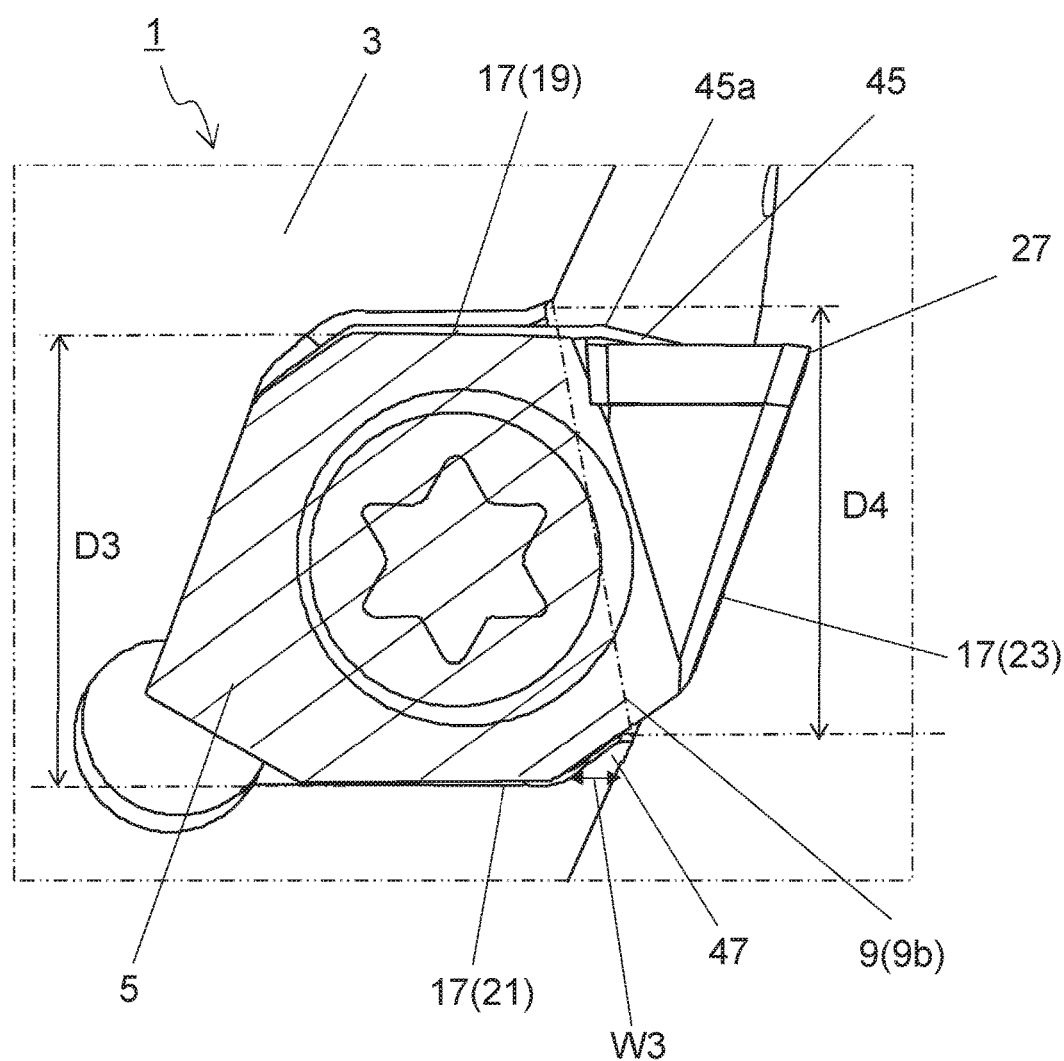
FIG. 9 is an enlarged view of the same area as shown in FIG. 6.

In the present embodiment, the front side surface 19 and the back side surface 21 of the insert 5 may be parallel to each other as shown in FIG. 9. In a direction perpendicular to the front side surface 19, a distance D3 between the front side surface 19 and the back side surface 21 may be longer than a width D4 of the second opening 9b. The insert 5 with the front side surface 19 and the back side surface 21 of the above dimensions can have the width W1 of the first portion 5a greater than the width W2 of the second opening 9b. This structure reduces the likelihood that the insert 5 is thrown off outside under a large centrifugal force.

The front side surface 19 and the back side surface 21 parallel to each other herein may not refer to the surfaces being precisely parallel to each other, but the surfaces may be substantially parallel to each other. For example, the back side surface 21 may tilt by an angle of about 5 degrees with respect to the front side surface 19.

As described above, the inner wall surfaces of the pocket 9 in the present embodiment may include the second inner surface 35 located more radially outward than the first inner surface 33 that is placed in contact with the back side surface 21 of the insert 5 as shown in FIG. 10. The second inner surface 35 is located more radially outward than any other inner wall surface of the pocket 9. The second inner surface 35 includes an end 35a located frontward in the rotation direction X2. The end 35a is a part of the second opening 9b shown in FIG. 9. In the top end view, the second inner surface 35 may be inclined frontward in the rotation direction X2 as going toward more radially outward. In other words, the second inner surface 35 may protrude from the first inner surface 33 frontward from the back in the rotation direction X2.

Being located radially outward herein refers to being located more radially outward than a virtual circle having the rotation axis X1 at its center and passing through a reference area in the top end view of the cutting tool 1. For example, the second inner surface 35 located more radially outward than the first inner surface 33 refers to the second inner surface 35 located more radially outward than a virtual circle having the rotation axis X1 at its center and passing through the first inner surface 33 in the top end view of the cutting tool 1.

The insert 5 including the above second inner surface 35 can have the width W1 of the first portion 5a greater than the width W2 of the second opening 9b without, for example, including V-notches or having a complicated structure. Under a large centrifugal force, the insert 5 can thus be caught at the second inner surface 35. This reduces the likelihood that the insert 5 is thrown off outside.

In the present embodiment, the second inner surface 35 may extend more radially outward than the radially inward end of the outer side surface 23. This structure allows the insert 5 to have a larger area for the back side surface 21, which is to be placed in contact with the pocket 9, and to have a width W1 of the first portion 5a greater than the width W2 of the second opening 9b. This facilitates restraints of the insert 5 in the holder 3 while lowering the likelihood that the insert 5 is thrown off outside.

The second inner surface 35 in the present embodiment may be located more radially inward than the peripheral cutting edge 27 included in the insert 5. The second inner surface 35 located more radially inward than the peripheral cutting edge 27 is unlikely to come in contact with a workpiece material during the cutting process, and thus is unlikely to be damaged. This also lowers the likelihood that the machined surface of a workpiece material is damaged.

In the top end view, the second inner surface 35 may be spaced from the insert 5. In other words, a gap may be formed between the second inner surface 35 and the insert 5. In the present embodiment, the inner side surface 25 of the insert 5 is placed in contact with the third inner surface 37 of the pocket 9. Thus, when a gap is formed between the outer side surface 23 located opposite to the inner side surface 25 of the insert 5 and the second inner surface 35 of the pocket 9, the insert 5 can be attached in the pocket 9 easily.

The second inner surface 35 may have other dimensions that allow the width W2 of the second opening 9b to be smaller than the width W1 of the first portion 5a of the insert 5.

In the present embodiment, the second inner surface 35 may include a protruding portion (protrusion 47) as shown in FIG. 9 in the top end view of the cutting tool 1. The protrusion 47 has its radial width W3 from the rotation axis X1 that decreases gradually frontward in the rotation direction X2. More specifically, the protrusion 47 in the present embodiment may have a greater radial width W3 from the rotation axis X1 in its base portion located backward in the rotation direction X2 than in its top end portion located frontward in the rotation direction X2.

This structure increases the durability of the protrusion 47 to prevent breakage of the protrusion 47. The protrusion 47 thus constantly prevents the insert 5 from being thrown off outside. Additionally, the insert does not have a large radial width W3 across the entire protrusion 47. This structure lowers the likelihood that the protrusion 47 protrudes radially outward and touches a workpiece material.

The width W3 of the base portion of the protrusion 47 may be, for example, about 1 to 20% of the radial width of the insert 5 from the rotation axis X1. The protrusion 47 may have a length of, for example, about 0.5 to 40% of the length of the insert 5 in the direction along the rotation direction X2. The inner side surface of the protrusion 47 or the second inner surface 35 may tilt by an angle of, for example, about 90 to 170 degrees with respect to the first inner surface 33 in the top end view.

Figure 2:
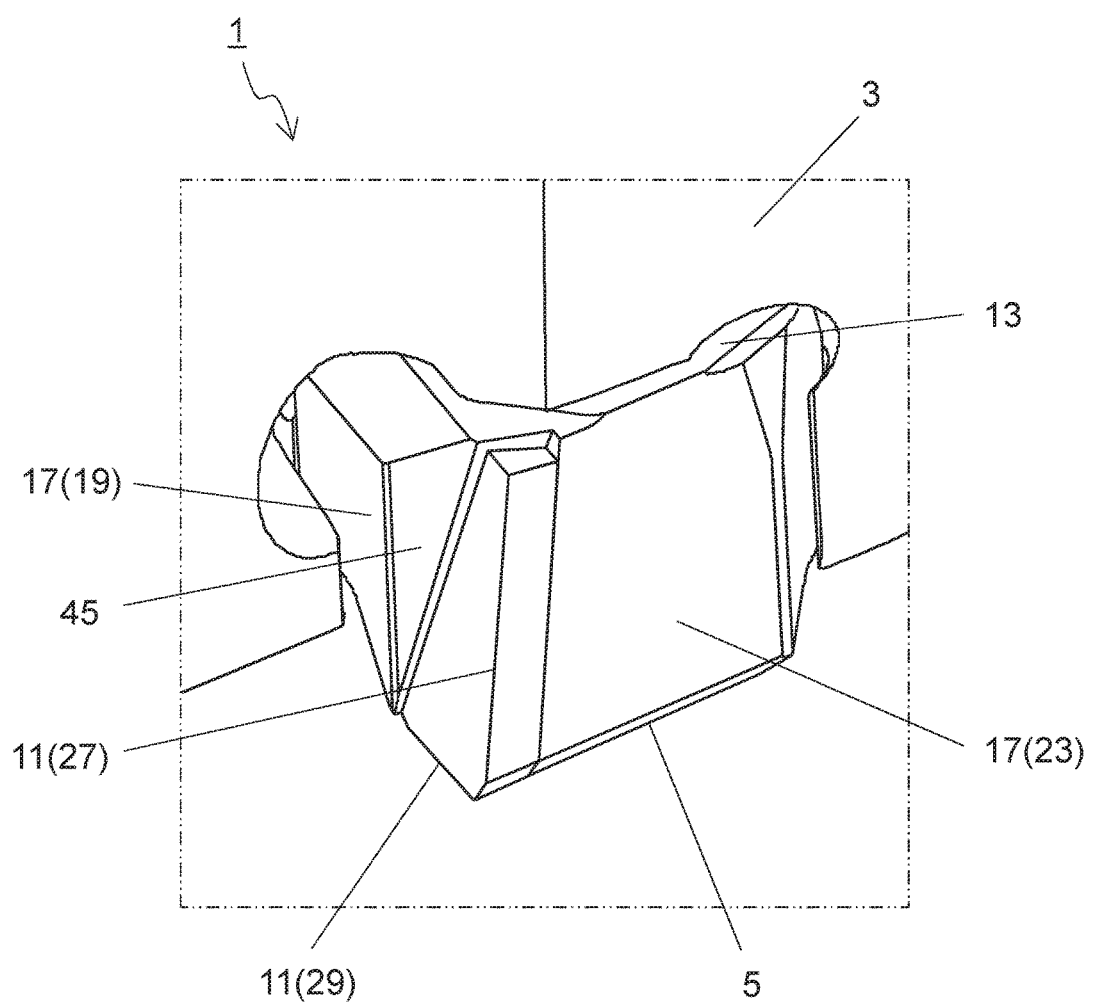
FIG. 2 is an enlarged view of an area A1 shown in FIG. 1.

In the present embodiment, the second inner surface 35 may have a tilt angle θ1 with respect to the first inner surface 33 that is less than a tilt angle θ2 of the third inner surface 37 with respect to the first inner surface 33 in the top end view. As described above, the insert 5 includes the upper surface 13, the lower surface 15, and the side surfaces 17. The side surfaces 17 include the front side surface 19, the back side surface 21, the outer side surface 23, and the inner side surface 25. As shown in FIG. 2, the front side surface 19 of the insert 5 in the present embodiment includes a first face 43 (rake face 43) along the peripheral cutting edge 27 and a second face 45 (rising wall 45) that is located more radially inward than the rake face 43. In the present embodiment, the inner peripheral end of the rake face 43 is adjacent to the rising wall 45. The rake face 43 is an area for clearing away chips generated by the peripheral cutting edge 27 during the cutting process. The rake face 43 tilts toward the back side surface 21 at greater distances from the peripheral cutting edge 27 to clear the chips smoothly. The insert 5 in the present embodiment includes the top cutting edge 29. The front side surface 19 of the insert 5 thus includes another rake face along the top cutting edge 29 in addition to the rake face 43.

The rising wall 45 is more radially inward than the rake face 43. The rising wall 45 tilts away from the back side surface 21 at greater distances from the rake face 43. In other words, the rising wall 45 is inclined frontward in the rotation direction X2 as going toward more radially inward. More specifically, the rising wall 45 may tilt by an angle of, for example, about 10 to 15 degrees with respect to the rake face 43 in the present embodiment. This rising wall 45 may be used to curl the chips collected by the rake face 43 into spirals.

In the cutting tool 1 according to the present embodiment, the second opening 9b of the pocket 9 is more radially inward than the rising wall 45 in the top end view as in FIG. 9. More specifically, the front end in the second opening 9b of the pocket 9 is more radially inward than the rising wall 45. This structure lowers the likelihood that chips from the rising wall 45 collide with the pocket 9, and allows the chips to be smoothly cleared away through the chip pocket 6. The pocket 9 is thus less likely to be damaged and is less likely to be clogged with chips.

In the top end view, the tilting rising wall 45 includes a first end 45a located frontward in the rotation direction X2. The first end 45a is located more frontward in the rotation direction X2 than the peripheral cutting edge 27. This structure allows chips generated by the peripheral cutting edge 27 to come in contact with the rising wall 45 in a reliable manner. The chips generated by the peripheral cutting edge 27 are thus less likely to be in contact with the holder 3 before contacting the rake face 43 and the rising wall 45. The holder 3 is thus less likely to be damaged.

As shown in FIGS. 11 and 13, the outer side surface 23 of the insert 5 in the present embodiment includes a first area 23a located adjacent to the front side surface 19 and a second area 23b located adjacent to the back side surface 21. The second area 23b is inclined toward the rotation axis X1 with respect to the first area 23a gradually toward the back side surface 21. As shown in FIG. 6, the second inner surface 35 extends more radially outward than its radially inward end of the second area 23b of the outer side surface 23. This structure easily increases the radial width W3 of the protrusion 47 in the rotation axis X1, and thus increases the strength of the protrusion 47.

Although the cutting tool 1 according to one embodiment has been described in detail with reference to the drawings, the structure of the cutting tool is not limited to the above embodiment.

A method for manufacturing a cut workpiece according to one embodiment of the disclosure will now be described with reference to the drawings.

The cut workpiece is manufactured by cutting the workpiece material 101. The method for manufacturing the cut workpiece according to the present embodiment includes the processes described below:

(1) rotating the cutting tool 1 according to the above embodiment about the rotation axis X1, (2) placing the cutting edge 11 included in the rotating cutting tool 1 in contact with the workpiece material 101, and (3) moving the cutting tool 1 away from the workpiece material 101.

Figure 15:
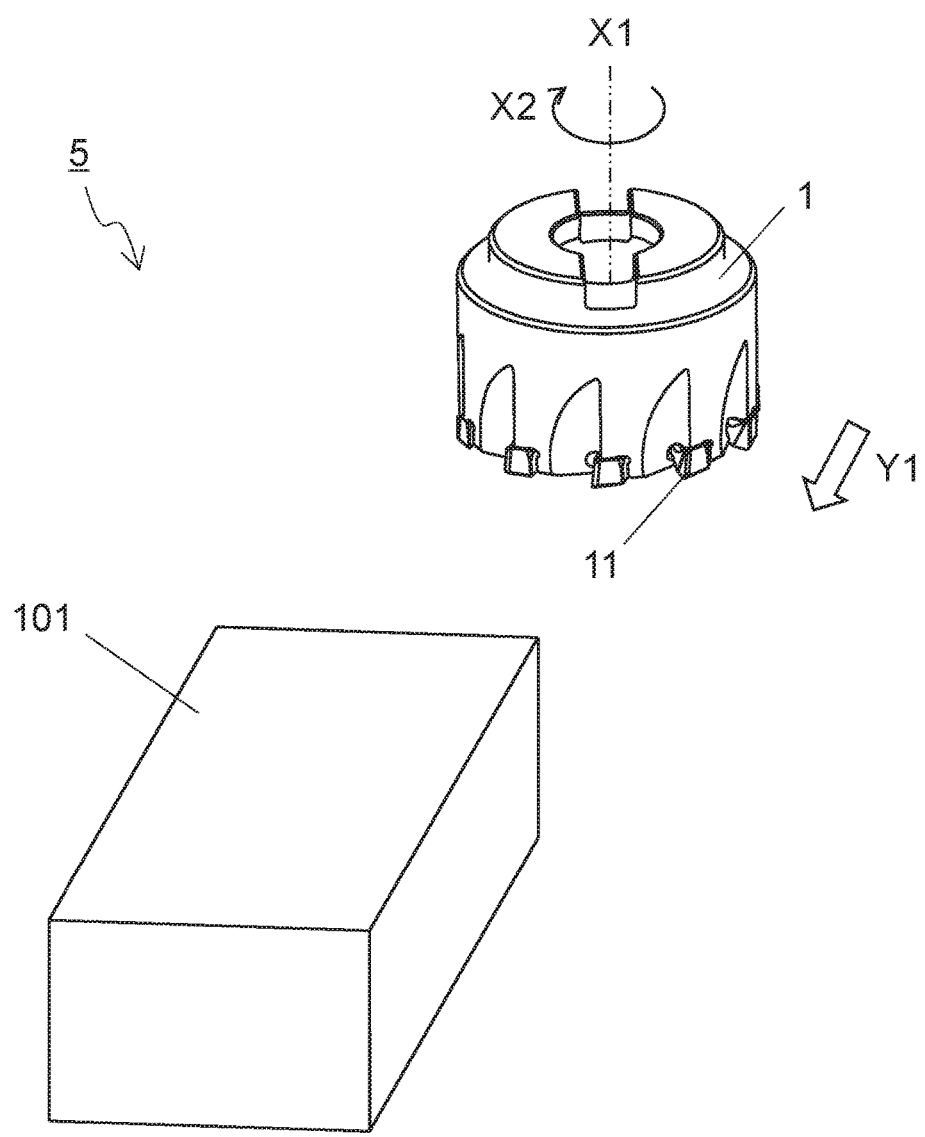
FIG. 15 is a schematic diagram of a process included in a method for manufacturing a cut workpiece according to one embodiment of the disclosure.
Figure 16:
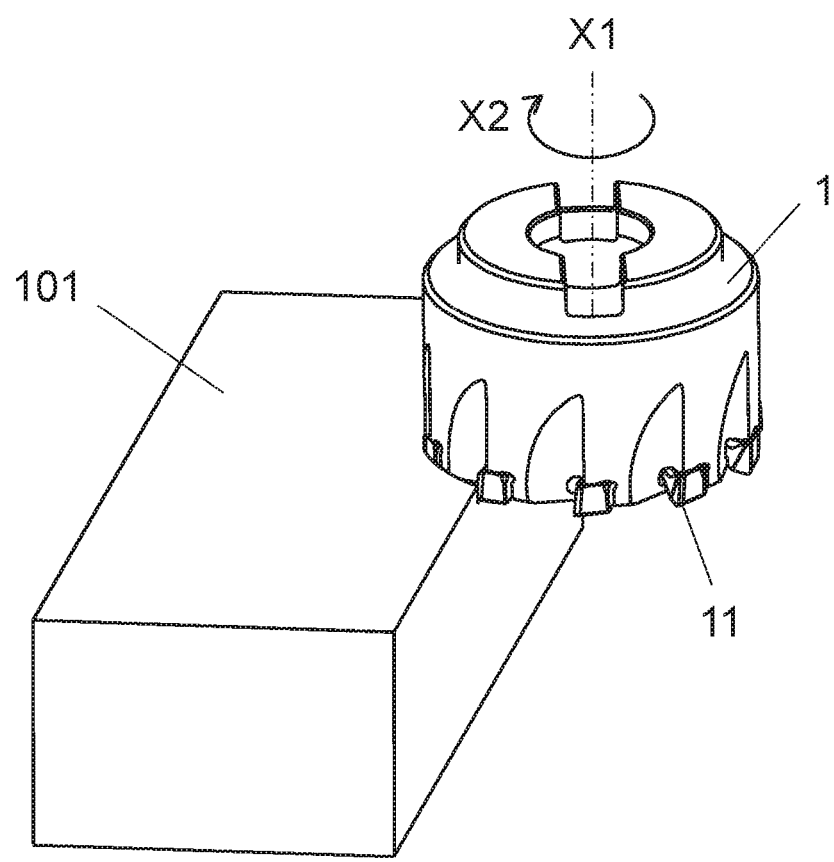
FIG. 16 is a schematic diagram of a process included in the method for manufacturing the cut workpiece according to the embodiment of the disclosure.
Figure 17:
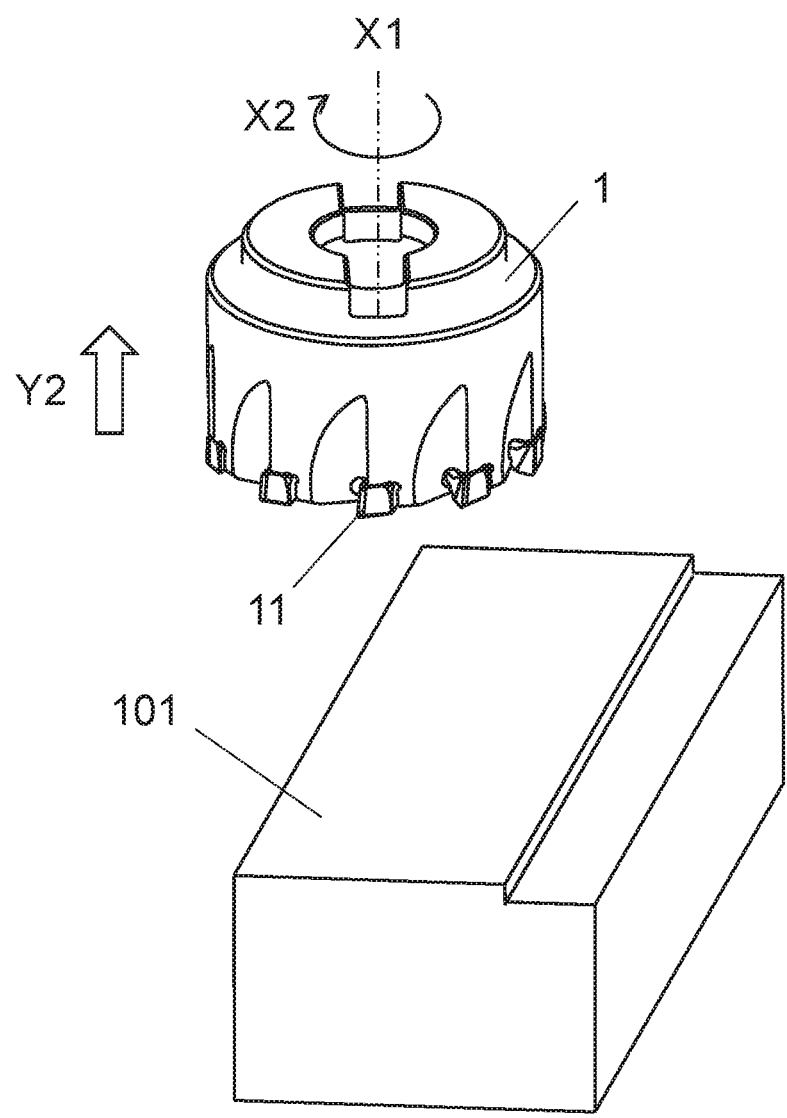
FIG. 17 is a schematic diagram of a process included in the method for manufacturing the cut workpiece according to the embodiment of the disclosure.

More specifically, as shown in FIG. 14, the cutting tool 1 is first rotated about the rotation axis X1 while being moved in a direction Y1. This allows the cutting tool 1 approach the workpiece material 101 relatively. Subsequently, as shown in FIG. 15, the cutting edges 11 included in the cutting tool 1 are placed in contact with the workpiece material 101 to cut the workpiece material 101. In the present embodiment, the peripheral cutting edges 27 and the top cutting edges 29 in the insert serve as the cutting edges 11 that are placed in contact with the workpiece material 101. As shown in FIG. 16, the cutting tool 1 is then moved in a direction Y2 to be away relative from the workpiece material 101.

In the present embodiment, the workpiece material 101 is fixed, and the cutting tool 1 is moved toward the workpiece material 101 while the cutting tool 1 is rotated about the rotation axis X1. In FIG. 15, the cutting edges 11 included in the rotating inserts are placed in contact with the workpiece material 101 to cut the workpiece material 101. In FIG. 16, the cutting tool 1 is moved away from the workpiece material 101 while rotating.

During the cutting processing implemented with the manufacturing method of the present embodiment, the cutting tool 1 is moved to be in contact with the workpiece material 101 or to be moved away from the workpiece material 101 in each process. However, the method is not limited to the embodiment.

For example, the workpiece material 101 may be moved toward to the cutting tool 1 in process (1). Similarly, the workpiece material 101 may be moved away from the cutting tool in process (3). To continue the cutting processing, the cutting edges 11 included in the inserts may be repeatedly placed in contact with different portions of the workpiece material 101 while the cutting tool 1 remains being rotated.

The workpiece material 101 may typically be formed from, for example, aluminum, carbon steel, alloy steel, stainless, cast iron, or nonferrous metals.

REFERENCE SIGNS LIST 1 cutting tool
3 holder
5 cutting insert (insert)
5a first portion
6 chip pocket
7 screw
9 pocket
9a first opening
9b second opening
11 cutting edge
13 upper surface
15 lower surface
17 side surface
19 first side surface (front side surface)
21 fourth side surface (back side surface)
23 second side surface (outer side surface)
23a first area
23b second area
25 third side surface (inner side surface)
27 first cutting edge (peripheral cutting edge)
29 top cutting edge
31 through-hole
33 first inner surface
35 second inner surface
35a end
37 third inner surface
39 fourth inner surface
41 fifth inner surface
43 first face (rake face)
45 second face (rising wall)
47 protrusion
101 workpiece material

What is claimed is:

1. A cutting tool, comprising:
a holder elongated and extending from a first end to a second end along a rotation axis, and comprising an insert pocket on a side of the first end,
the insert pocket comprising an opening disposed in an end surface of the first end of the holder and in an outer peripheral surface; and
a cutting insert located in the insert pocket, and comprising:
a cutting edge; and
a first portion located more radially inward than an outer peripheral end of the opening in a front view of the first end,
wherein the first portion having a greater width than the opening in a direction along a rotation direction of the rotation axis,
the cutting insert further comprises:
a first side surface located frontward in the rotation direction;
a second side surface located radially outward from the rotation axis;
a third side surface located more radially inward than the second side surface and being in contact with the insert pocket; and
a fourth side surface located more backward in the rotation direction than the first side surface and being in contact with the insert pocket,
the cutting edge comprises a first cutting edge located at a boundary between the first side surface and the second side surface, and
in the front view of the first end, the first side surface has a distance to the fourth side surface greater than a width of the opening in a direction perpendicular to the first side surface.

2. The cutting tool according to claim 1, wherein
in the front view of the first end, the first portion has a length greater than an open length of the opening in a direction parallel to the open length of the opening.

3. The cutting tool according to claim 1, wherein
the first side surface is parallel to the fourth side surface.

4. The cutting tool according to claim 1, wherein
the insert pocket comprises:
a first inner surface in contact with the fourth side surface; and
a second inner surface located more radially outward than the first inner surface, and
in the front view of the first end, the second inner surface is inclined frontward in the rotation direction as going toward more radially outward.

5. The cutting tool according to claim 4, wherein
the second inner surface extends more radially outward than an radially inward end of the second side surface of the cutting insert.

6. The cutting tool according to claim 4, wherein
the second inner surface is located more radially inward than the first cutting edge included in the cutting insert.

7. The cutting tool according to claim 4, wherein
in the front view of the first end, the second inner surface is spaced from the cutting insert.

8. The cutting tool according to claim 1, wherein
the first side surface includes
a first face located along the first cutting edge, and
a second face located more radially inward than the first face, and being inclined frontward in the rotation direction as going toward more radially inward, and
the opening is more radially inward than the second face.

9. The cutting tool according to claim 8, wherein
in the front view of the first end, the second face comprises a first end located frontward in the rotation direction, and
the first end is located more frontward in the rotation direction than the cutting edge.

10. The cutting tool according to claim 2, wherein
the first side surface is spaced from the insert pocket.

11. The cutting tool according to claim 1, wherein
the cutting insert further comprises a through-hole extending in the direction along the rotation axis, and
the cutting insert is secured to the holder with a screw inserted in the through-hole.

12. A method for manufacturing a cut workpiece, comprising:
rotating the cutting tool according to claim 1;
placing the cutting edge in the rotating cutting tool in contact with a workpiece material; and
moving the cutting tool away from the workpiece material.

13. A cutting tool, comprising:
a holder elongated and extending from a first end to a second end along a rotation axis, and comprising an insert pocket on a side of the first end,
the insert pocket comprising an opening disposed in an end surface of the first end of the holder and in an outer peripheral surface; and
a cutting insert located in the insert pocket, and comprising:
a cutting edge; and
a first portion located more radially inward than an outer peripheral end of the opening in a front view of the first end,
wherein
the first portion having a greater width than the opening in a direction along a rotation direction of the rotation axis, and
the cutting insert further comprises a through-hole extending in the direction along the rotation axis.

14. The cutting tool according to claim 13, wherein
the cutting insert is secured to the holder with a screw inserted in the through-hole.

15. A method for manufacturing a cut workpiece, comprising:
rotating the cutting tool according to claim 13;
placing the cutting edge of the rotating cutting tool in contact with a workpiece material; and
moving the cutting tool away from the workpiece material.

16. A cutting tool, comprising:
a holder elongated and extending from a first end to a second end along a rotation axis, and comprising an insert pocket on a side of the first end,
the insert pocket comprising an opening disposed in an end surface of the first end of the holder and in an outer peripheral surface; and
a cutting insert located in the insert pocket, and comprising:
a first side surface;
a second side surface;
a cutting edge located at an intersection of the first side surface and the second side surface; and
a first portion located more radially inward than an outer peripheral end of the opening in a front view of the first end, wherein
the first portion having a greater width than the opening in a direction along a rotation direction of the rotation axis,
the first side surface comprises:
a first face located along the first cutting edge, and
a second face located more radially inward than the first face, and obtusely intersecting the first face, and
the opening is more radially inward than the second face.

17. The cutting tool according to claim 16, wherein
in the front view of the first end, the second face comprises a first end located frontward in the rotation direction, and
the first end is located more frontward in the rotation direction than the cutting edge.

18. A method for manufacturing a cut workpiece, comprising:
rotating the cutting tool according to claim 16;
placing the cutting edge in the rotating cutting tool in contact with a workpiece material; and
moving the cutting tool away from the workpiece material.

* * * * *